United States Patent [19]

Dukess

[11] 3,976,217
[45] Aug. 24, 1976

[54] CAP LINER CONSTRUCTION

[76] Inventor: Joseph Dukess, 517 Fayette Ave., Mamaroneck, N.Y. 10543

[22] Filed: June 23, 1975

[21] Appl. No.: 589,257

Related U.S. Application Data

[62] Division of Ser. No. 482,417, June 24, 1974, Pat. No. 3,917,100.

[52] U.S. Cl. .............................. 215/329; 215/347; 215/348
[51] Int. Cl.² ........................................ B65D 53/04
[58] Field of Search ............ 215/329, 347, 348, 350

[56] References Cited
UNITED STATES PATENTS

| | | | |
|---|---|---|---|
| 2,039,757 | 5/1936 | Von Till | 215/329 |
| 2,389,761 | 11/1945 | Burgeni | 215/347 |
| 2,626,073 | 1/1953 | Miller | 215/347 X |

*Primary Examiner*—Donald F. Norton
*Attorney, Agent, or Firm*—Kenneth S. Goldfarb

[57] ABSTRACT

Cap liner construction in the form of a sandwich and so arranged that a compressible intermediate layer of relatively great thickness is disposed between two relatively thin non-resilient layers. The cap liner is sealed to the cap. The intermediate layer can be squeezed beyond the periphery of the material for making a better seal. Another embodiment discloses a two layer liner bonded to the cap.

5 Claims, 7 Drawing Figures

U.S. Patent  Aug. 24, 1976  3,976,217
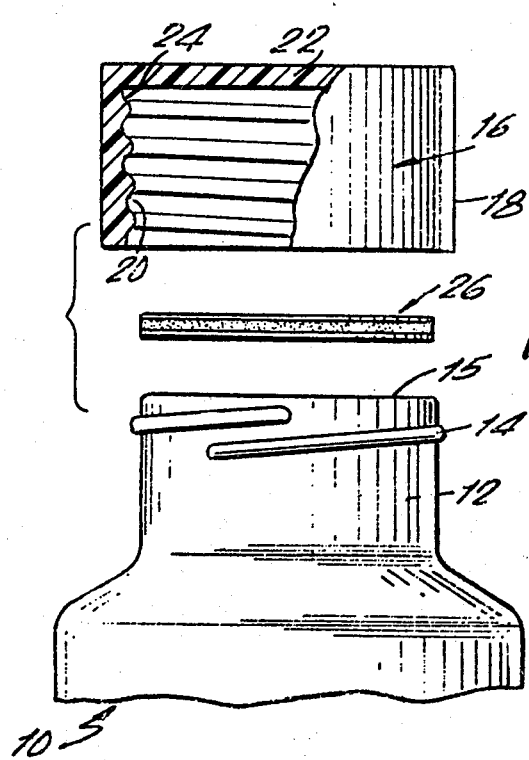
FIG.1
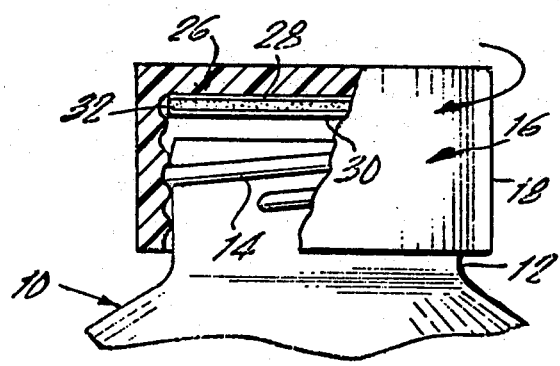
FIG.2
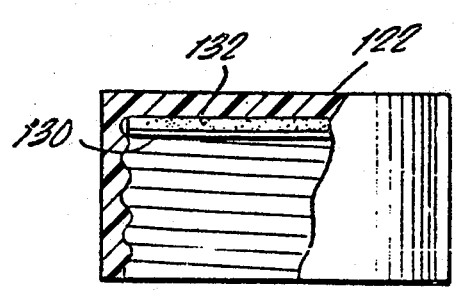
FIG. 6
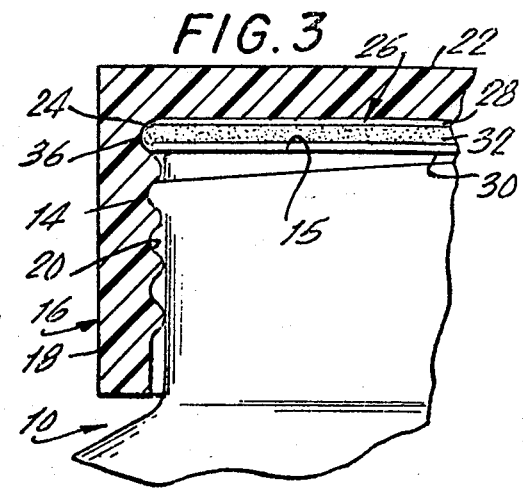
FIG.3
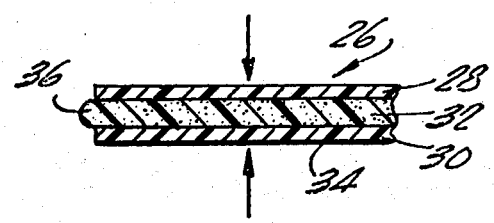
FIG.4
FIG.5
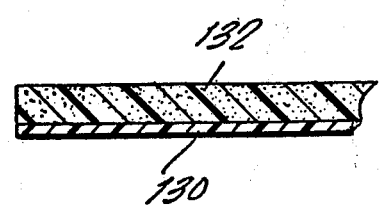
FIG. 7

CAP LINER CONSTRUCTION

REFERENCE TO RELATED APPLICATION

This application is a division of application Ser. No. 482,417 now U.S. Pat. No. 3,917,100 for TWO LAYER MATERIAL FOR CAP LINER.

DESCRIPTION OF THE PRIOR ART

Various types of liner constructions for caps have been devised in the past. These liners are employed to seal the contents of the container preventing leaking between the threaded portions of a container neck and the cap by providing for a positive seal at the mouth of the container. Such previous cap constructions and liners and material used for liners therefor have been a compromise between the requirement that the liner material be stress and crack resistant while also being moisture impervious and impervious to chemicals and acids, yet being bendable and compressible enough to provide for an effective seal. The present invention overcomes the difficulties of the prior art liner material and has all of the advantages of these prior materials without the corresponding disadvantages. A further advantage of the liner according to the present invention is that liners are capable of being stamped out of stock liner material without freezing.

SUMMARY OF THE INVENTION

One of the features of the invention resides in liner material capable of forming a liner that is freely rotatable within the cap until such time as the liner is sealed in the cap. In addition, an intermediate layer of the liner is compressed and expands outwardly thereby abutting against the side walls of the cap for making a most effective seal.

A further object of the invention resides in the production of a liner material that is capable of being extruded as a multi-layer sandwich.

Still further, objects and features of this invention resides in the provision of a cap and liner therefor that is capable of being extruded by conventional machinery and which can be conveniently stamped to shape without requiring freezing thereby permitting manufacture at a relatively low cost, and which is highly effective in use.

These, together with the various ancillary objects and features of this invention, which will become apparent as the following description proceeds, are attained by this liner material, a preferred embodiment of which is illustrated in the accompanying drawing, by way of example only, wherein:

BRIEF DESCRIPTION OF THE DRAWING

FIG. 1 is an exploded sectional detail view illustrating the cap and liner therefor made from liner material according to the invention;

FIG. 2 is a sectional detail view showing the cap liner therefor in a stage of being secured on the neck of a container;

FIG. 3 is an enlarged vertical detail view illustrating a portion of the cap and liner therefor as firmly secured on a container;

FIG. 4 is a partial sectional view of the liner material;

FIG. 5 is a view similar to FIG. 4 but showing the shape of the liner after it has been compressed when the cap has been tightly closed on the container;

FIG. 6 is a sectional view of a modification; and

FIG. 7 is a sectional detail view of a modified form of liner material.

DETAILED DESCRIPTION OF THE PREFERRED EMBODIMENT

With continuing reference to the accompanying drawing, wherein like reference numerals designate similar parts throughout the various views, reference numeral 10 is used to generally designate a conventional container such as a bottle, tube, or can having a neck 12 which is threaded at 14. In order to provide a closure for the container 10 a cap 16 is employed which includes cylindrical side walls 18 which are internally threaded at 20 and a top 22. A cylindrical groove 24 may be formed as the uppermost of the threads 20 and is for the purpose of receiving therein a liner 26. The cap is preferably molded out of any suitable synthetic plastic material and is adapted to be threadedly secured on the neck 12 with the threads 20 engaging the threads 14.

The liner 26, see FIG. 4, is from a liner material in accordance with the invention formed of a sandwich of outer layers 28, and 30, and an innerlayer 32, the liner 26 preferably being stamped in the shape of a disc. The outer layers 28 and 30 are formed of a low density polyethylene, such as that sold under the trademark "Alathion 20". This material is stress resistant, crack resistant, relatively non-resilient, impervious and is extruded in a very thin layer in the order of approximately 1½ one-thousandths of an inch. The intermediate layer 32 is a thermoplastic rubber like material such as butylene in polyethylene known as pliothene, or other resilient material such as ethylene vinyl acetate or the material sold under the trademark Karton, which is a thermoplastic rubber. Particularly, this material is resilient though not necessarily as resistant to stress and cracks/or as impervious to foreign substances as the material of the outer layers 28 and 30. When the sandwich is manufactured by way of simultaneous multiple extrusion, the outer layers 28 and 30 are extruded at a temperature approximately 300° to 400°F while the intermediate layer 32 is extruded at approximately 220°F to 320°F. The various layers are brought together within a combination dye and at about 330°F for bonding within the combination dye. The resultant sheet material has a much increased resistance to distortion or stress, can be stamped without freezing and is impervious to chemicals and acids as well as moisture.

The disc 26 may be inserted in the groove 24 and bonded by adhesives, ultrasonics, heat or other means to the cap 16 at the top 22. Closure of the cap 16 will cause the resilient intermediate layer 32 to be compressed exuding a tongue 36 beyond the peripheral edges of the outer layers 28 and 30 and as shown in FIG. 3 against the inner wall of the groove 24 sealing the liner 26 with the cap 16. Thus, there is achieved an inner effective seal and closure for the contents of the container 10 than heretofore possible to achieve while retaining all of the desirable features of the nonresilient low density polyethylene which is used for the outer layers, and which are relatively thin so as to permit for an effectively resilient liner.

It has been found that for the liner material according to the invention it is desirable that the intermediate layer 32 be between 12 to 30 times the normal width of each of the outer layers 28 and 30.

In FIGS. 6 and 7 there is shown a modified form of the invention wherein a two-ply liner is used. The cap has its top 122 serve as the upper outer liner, there being only an intermediate liner 132 bonded to the top and a lower outer liner 130.

In connection with the two ply liner, it has been found that the intermediate layer may be made of a foamed polyethylene and may be from 12 to 40 times the thickness of the outer layer. The use of foamed polyethylene results in a saving of material. The foamed polyethylene may be bonded by any suitable adhesive to the undersurface of the top of the cap as desired.

A latitude of modification, substitution and change is intended in the foregoing disclosure, and in some instances some features of the invention will be employed without a corresponding use of other features.

I claim:

1. A closure device comprising a cap having a top and an internally threaded cylindrical side wall, said side wall having a groove therein adjacent said top, a liner disposed in said groove and including a disc having one outer layer and an intermediate layer bonded to said outer layer, said liner being bonded to said top, said outer layer being relatively thin and non-resilient, said intermediate layer being resilient and being compressible to form a lip extending beyond the periphery of said outer layer and into engagement with said side wall in said groove for forming a seal, said intermediate layer being relatively thick.

2. A closure device according to claim 1, wherein said intermediate layer is bonded to said top and is from 12 to 40 times the thickness of said outer layer.

3. A closure device according to claim 2, wherein said outer layer is of a low density polyethylene, said intermediate layer being engageable with said top and being of a thermoplastic rubberlike material.

4. A closure device according to claim 3, wherein said intermediate layer is of ethylene vinyl acetate copolymer.

5. A closure device according to claim 2, wherein said intermediate layer is of foamed polyethylene.

* * * * *